(12) United States Patent
Pasumarthi et al.

(10) Patent No.: US 9,867,182 B2
(45) Date of Patent: Jan. 9, 2018

(54) APPARATUS AND METHOD FOR SCHEDULING CELL BROADCAST MESSAGES

(71) Applicant: QUALCOMM Incorporated, San Diego, CA (US)

(72) Inventors: Srinivasarao Pasumarthi, Hyderabad (IN); Sudheer Kulakcherla, Hyderabad (IN); Naveen Kumar Hanchate, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 169 days.

(21) Appl. No.: 14/872,422

(22) Filed: Oct. 1, 2015

(65) Prior Publication Data
US 2016/0029378 A1    Jan. 28, 2016

Related U.S. Application Data

(62) Division of application No. 13/875,224, filed on May 1, 2013, now Pat. No. 9,179,439.
(Continued)

(51) Int. Cl.
*G01R 31/08* (2006.01)
*H04L 5/14* (2006.01)
(Continued)

(52) U.S. Cl.
CPC ......... *H04W 72/0446* (2013.01); *H04L 69/22* (2013.01); *H04W 4/06* (2013.01); *H04W 72/005* (2013.01); *H04W 72/1289* (2013.01)

(58) Field of Classification Search
CPC ............. H04W 72/12; H04W 72/1205; H04W 72/1226; H04W 72/1278; H04W 74/008
See application file for complete search history.

(56) References Cited

U.S. PATENT DOCUMENTS 8,144,655 B2 † 3/2012 Cho et al.
9,179,439 B2 † 11/2015 Pasumarthi, et al.
(Continued)

FOREIGN PATENT DOCUMENTS

KR  20090089708 A † 8/2009
WO  WO-2004017579 A1 † 2/2004
WO  WO-2009038367 A1 † 3/2009

OTHER PUBLICATIONS

3GPP TS 23.041: "3rd Generation Partnership Project; Technical Specification Group Core Network and Terminals; Technical realization of Cell Broadcast Service (CBS)", Version 8.7.0, Release 8, Dec. 2011, pp. 44.†
(Continued)

*Primary Examiner* — Brian Roberts
*Assistant Examiner* — Abu-Sayeed Haque
(74) *Attorney, Agent, or Firm* — The Marbury Law Group, PLLC

(57) ABSTRACT

Methods, apparatus, and computer readable storage media are described. The apparatus may receive a next cell broadcast message or a schedule message according to schedule information in first-received cell broadcast message. The schedule information may indicate timing of the next cell broadcast message or the schedule message. The first cell broadcast message may be received before timing information associated with a cell broadcast channel is known, including after a reselection procedure or after termination of a voice call. The schedule information may relate to a discontinuous reception schedule defined in a missed schedule message. Presence of the schedule information in the first cell broadcast message may be indicated in a page parameter of a header of the first cell broadcast message or in a block identifier of the first cell broadcast message. A
(Continued)

network entity is described that adds the schedule information to the first cell broadcast message.

28 Claims, 11 Drawing Sheets

Related U.S. Application Data

(60) Provisional application No. 61/640,907, filed on May 1, 2012.

(51) Int. Cl.

| | | |
|---|---|---|
| *H04B 7/00* | (2006.01) | |
| *H04J 3/00* | (2006.01) | |
| *H04J 3/16* | (2006.01) | |
| *H04W 72/04* | (2009.01) | |
| *H04W 72/00* | (2009.01) | |
| *H04L 29/06* | (2006.01) | |
| *H04W 4/06* | (2009.01) | |
| *H04W 72/12* | (2009.01) | |

(56) References Cited

U.S. PATENT DOCUMENTS

| | | | |
|---|---|---|---|
| 9,693,299 B2* | 6/2017 | Doppler | H04W 52/0206 |
| 2005/0147040 A1† | 7/2005 | Vayanos et al. | |
| 2005/0193309 A1† | 9/2005 | Grilli et al. | |
| 2006/0094441 A1* | 5/2006 | Beckmann | H04L 12/189 |
| | | | 455/455 |
| 2006/0156370 A1* | 7/2006 | Parantainen | H04L 12/189 |
| | | | 725/132 |
| 2008/0141094 A1† | 6/2008 | Vayanos et al. | |
| 2009/0181700 A1* | 7/2009 | Willey | H04W 68/02 |
| | | | 455/458 |
| 2010/0035601 A1* | 2/2010 | Chen | H04W 4/20 |
| | | | 455/423 |
| 2010/0290389 A1* | 11/2010 | Hou | H04W 48/12 |
| | | | 370/328 |
| 2011/0171923 A1* | 7/2011 | Daly | H04L 12/12 |
| | | | 455/404.1 |
| 2011/0201365 A1† | 8/2011 | Segura | |
| 2012/0051274 A1* | 3/2012 | Song | H04W 48/10 |
| | | | 370/311 |
| 2012/0113947 A1† | 5/2012 | Kim et al. | |
| 2012/0250538 A1* | 10/2012 | Su | H04W 52/0229 |
| | | | 370/252 |
| 2013/0022084 A1† | 1/2013 | Vasseur et al. | |
| 2013/0044609 A1* | 2/2013 | Chen | H04W 4/003 |
| | | | 370/252 |
| 2013/0155954 A1† | 6/2013 | Wang et al. | |

OTHER PUBLICATIONS

"Digital cellular telecommunications system (Phase 2+); Short Message Service Cell Broadcast (SMSCB) support on the mobile radio interface (3GPP TS 44.012 version 10.0.0 Release 10)", Technical Specification, European Telecommunications Standards Institute (ETSI), 650, Route Des Lucioles ; F-06921 Sophia-Antipolis; France, vol. 3GPP GERAN 2, No. V10.0.0, Apr. 1, 2011 (Apr. 1, 2011), XP014065418, p. 5, paragraph 2.1—p. 6 p. 8, paragraph 3.5—p. 9, paragraph 3.5.2.†

International Search Report and Written Opinion—PCT/US2013/039145—ISA-/EPO—dated Jul. 31, 2013.†

\* cited by examiner
† cited by third party

APPARATUS AND METHOD FOR SCHEDULING CELL BROADCAST MESSAGES

CROSS-REFERENCE TO RELATED APPLICATIONS

The present Application for Patent is a divisional of patent application Ser. No. 13/875,224, entitled "Apparatus And Method For Scheduling Cell Broadcast Messages" filed May 1, 2013, pending, which claims priority to Provisional Application No. 61/640,907 entitled "Apparatus And Method For Scheduling Cell Broadcast Messages" filed May 1, 2012, and assigned to the assignee hereof and hereby expressly incorporated by reference herein.

BACKGROUND

Field

Aspects of the present disclosure relate generally to wireless communication systems, and more particularly, to wireless reception of Cell Broadcast Service messages.

Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but also to advance and enhance the user experience with mobile communications.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the disclosure provides a method of wireless communication, including receiving a Cell Broadcast Message comprising schedule information indicating timing of a next Cell Broadcast Message, and receiving the next Cell Broadcast Message according to the received schedule information.

In another aspect, the disclosure provides a user equipment (UE) configured for wireless communication, including at least one processor, a memory coupled to the at least one processor, and a communication interface coupled to the at least one processor. Here, the at least one processor is configured to receive a Cell Broadcast Message comprising schedule information indicating timing of a next Cell Broadcast Message, and to receive the next Cell Broadcast Message according to the received schedule information.

In another aspect, the disclosure provides an apparatus configured for wireless communication, including means for receiving a Cell Broadcast Message comprising schedule information indicating timing of a next Cell Broadcast Message, and means for receiving the next Cell Broadcast Message according to the received schedule information.

In another aspect, the disclosure provides a computer program product, including a computer-readable storage medium having instructions for causing a computer to receive a Cell Broadcast Message comprising schedule information indicating timing of a next Cell Broadcast Message, and to receive the next Cell Broadcast Message according to the received schedule information.

According to certain aspects of the disclosure, a method of wireless communication comprises receiving a first cell broadcast message and receiving a next cell broadcast message or a schedule message according to schedule information in the first cell broadcast message. The schedule information may indicate timing of the next cell broadcast message or the schedule message. The first cell broadcast message may be received before timing information associated with a cell broadcast channel is known. For example, the first cell broadcast message may be received after a reselection procedure or after termination of a voice call. The schedule information in the first cell broadcast message may relate to a discontinuous reception schedule defined in a missed schedule message. Presence of the schedule information in the first cell broadcast message may be indicated in a page parameter of a header of the first cell broadcast message and/or in a block identifier of the first cell broadcast message.

According to certain aspects of the disclosure, a method of wireless communication comprises transmitting a schedule message to a user equipment, and transmitting a cell broadcast message after the schedule message, where the cell broadcast message includes at least a portion of the scheduling information. The schedule message may define timing for a cell broadcast channel. The cell broadcast message may include an indicator of presence of scheduling information in a header of the cell broadcast message. The indicator may be provided in a block type octet or in a page parameter field.

These and other aspects of the invention will become more fully understood upon a review of the detailed description, which follows.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Figure 1:
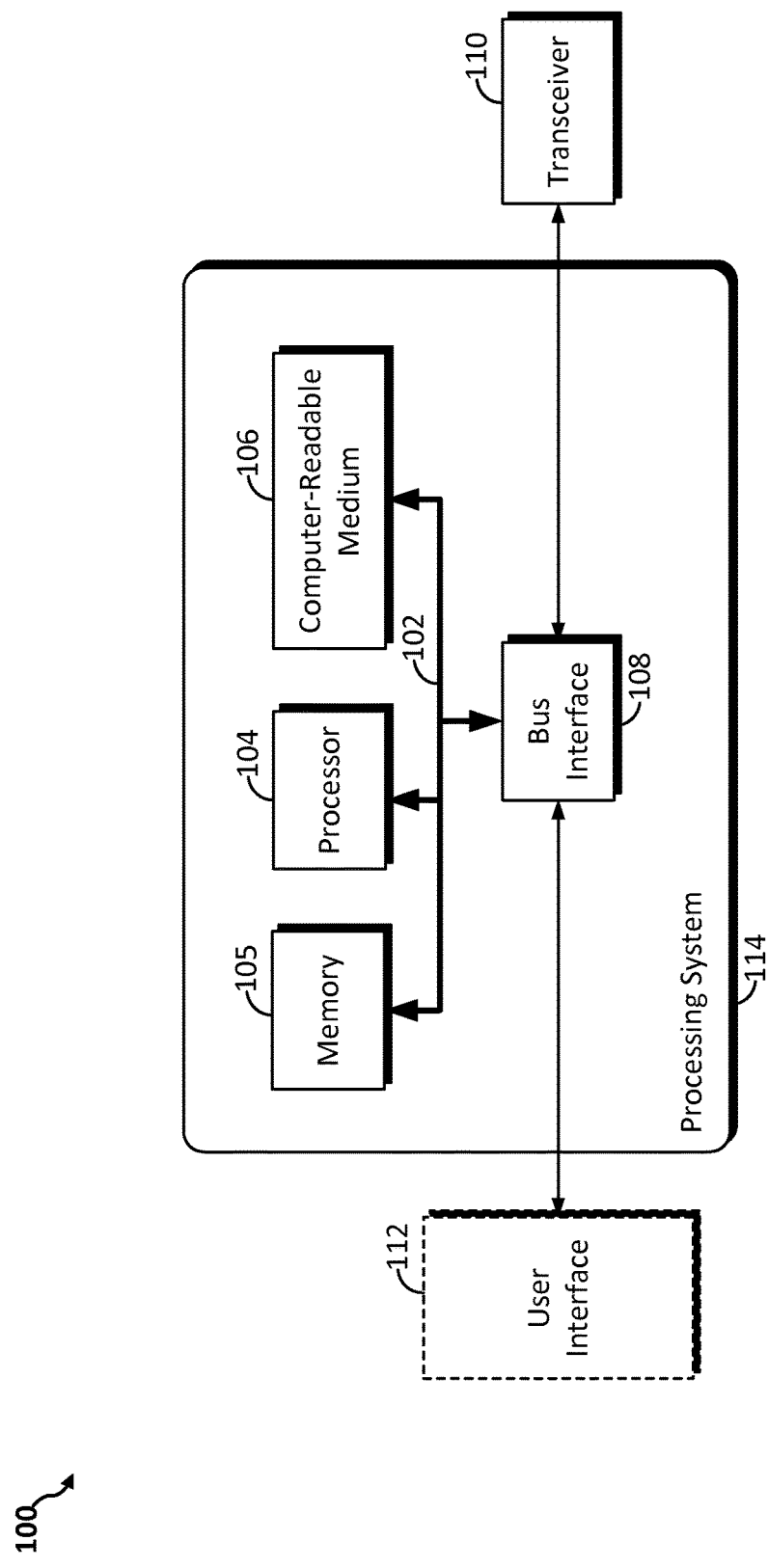
FIG. 1 is a block diagram illustrating an example of a hardware implementation for an apparatus employing a processing system.

FIG. 1 is a conceptual diagram illustrating an example of a hardware implementation for an apparatus 100 employing a processing system 114. In accordance with various aspects of the disclosure, an element, or any portion of an element, or any combination of elements may be implemented with a processing system 114 that includes one or more processors 104. Examples of processors 104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors (represented generally by the processor 104), a memory 105, and computer-readable media (represented generally by the computer-readable medium 106). The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

One or more processors 104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 106. The computer-readable medium 106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 106 may reside in the processing system 114, external to the processing system 114, or distributed across multiple entities including the processing system 114. The computer-readable medium 106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 2:
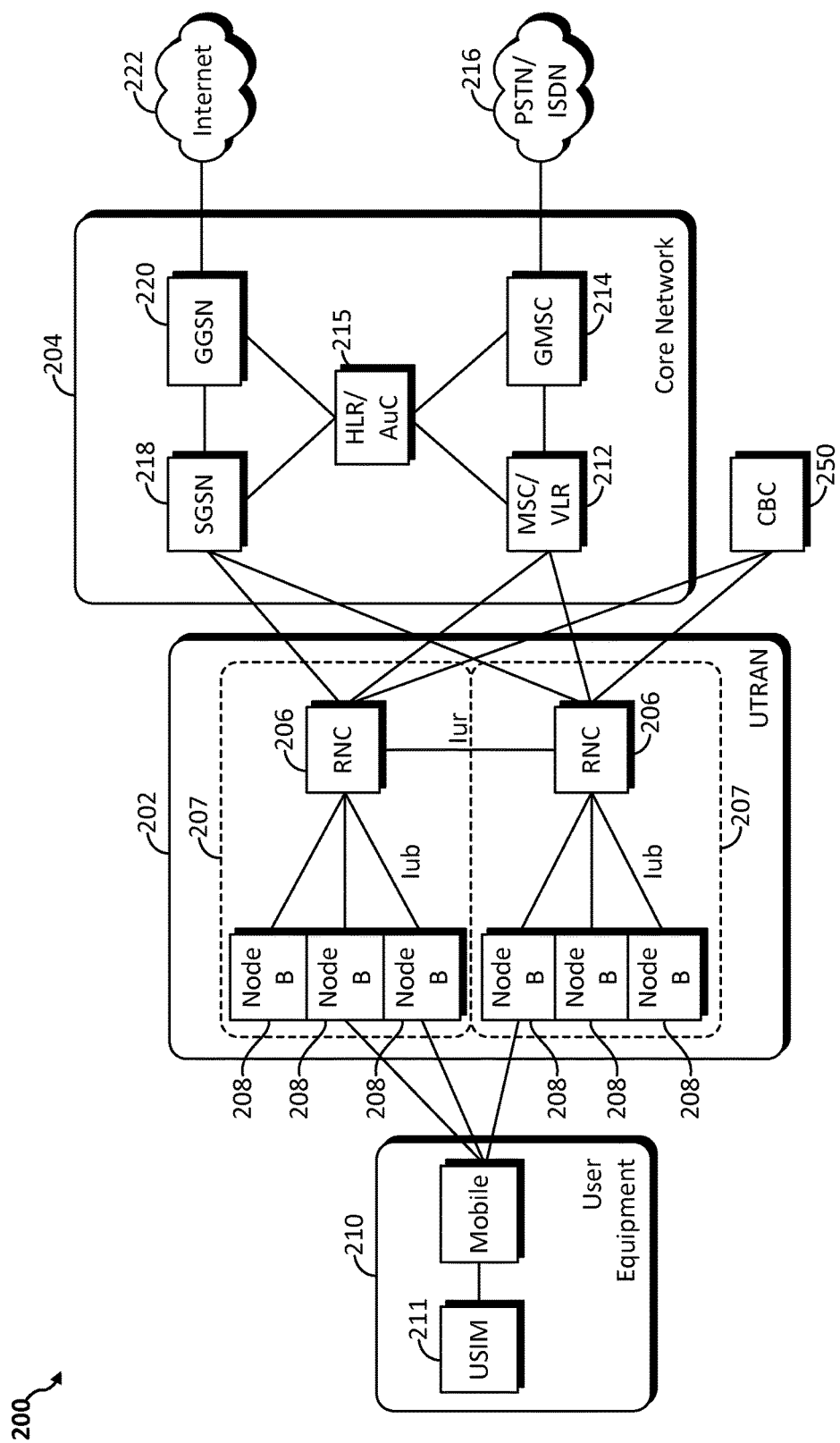
FIG. 2 is a block diagram conceptually illustrating an example of a telecommunications system.

The various concepts presented throughout this disclosure may be implemented across a broad variety of telecommunication systems, network architectures, and communication standards. Referring now to FIG. 2, as an illustrative example without limitation, various aspects of the present disclosure are illustrated with reference to a Universal Mobile Telecommunications System (UMTS) system 200. A UMTS network includes three interacting domains: a core network 204, a radio access network (RAN) (e.g., the UMTS Terrestrial Radio Access Network (UTRAN) 202), and a UE 210. Among several options available for a UTRAN 202, in this example, the illustrated UTRAN 202 may employ a W-CDMA air interface for enabling various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207 in addition to the illustrated RNCs 206 and RNSs 207. The RNC 206 is an apparatus responsible for, among other things, assigning, reconfiguring, and releasing radio resources within the RNS 207. The RNC 206 may be interconnected to other RNCs (not shown) in the UTRAN 202 through various types of interfaces such as a direct physical connection, a virtual network, or the like using any suitable transport network.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provide wireless access points to a core network 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as UE in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The downlink (DL), also called the forward link, refers to the communication link from a Node B 208 to a UE 210 and the uplink (UL), also called the reverse link, refers to the communication link from a UE 210 to a Node B 208.

The core network 204 may interface with one or more access networks, such as the UTRAN 202. As shown, the core network 204 is a UMTS core network. However, as those skilled in the art will recognize, the various concepts presented throughout this disclosure may be implemented in a RAN, or other suitable access network, to provide UEs with access to types of core networks other than UMTS networks.

The illustrated UMTS core network 204 includes a circuit-switched (CS) domain and a packet-switched (PS) domain. Some of the circuit-switched elements are a Mobile services Switching Centre (MSC), a Visitor Location Register (VLR), and a Gateway MSC (GMSC). Packet-switched elements include a Serving GPRS Support Node (SGSN) and a Gateway GPRS Support Node (GGSN). Some network elements, like EIR, HLR, VLR, and AuC may be shared by both of the circuit-switched and packet-switched domains.

In the illustrated example, the core network 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a visitor location register (VLR) that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The illustrated core network 204 also supports packet-switched data services with a serving GPRS support node (SGSN) 218 and a gateway GPRS support node (GGSN) 220. General Packet Radio Service (GPRS) is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

In a UMTS network that supports Cell Broadcast technology, the RNC 206 may be coupled to a Cell Broadcast Center (CBC) 250. In one example, the CBC 250 is coupled to the RNC 206 using a standards defined interface, such as an IuBC interface, which may utilize standardized TCP/IP communication. In another example, the CBC 250 may be coupled to a Base Station Controller (BSC) in a GSM network. Typically, the CBC 250 may transmit information to the RNC 206 that relates to a Cell Broadcast Message to be transmitted to the UEs 210. The UTRAN 202 is one example of a RAN that may be utilized in accordance with the present disclosure.

Figure 3:
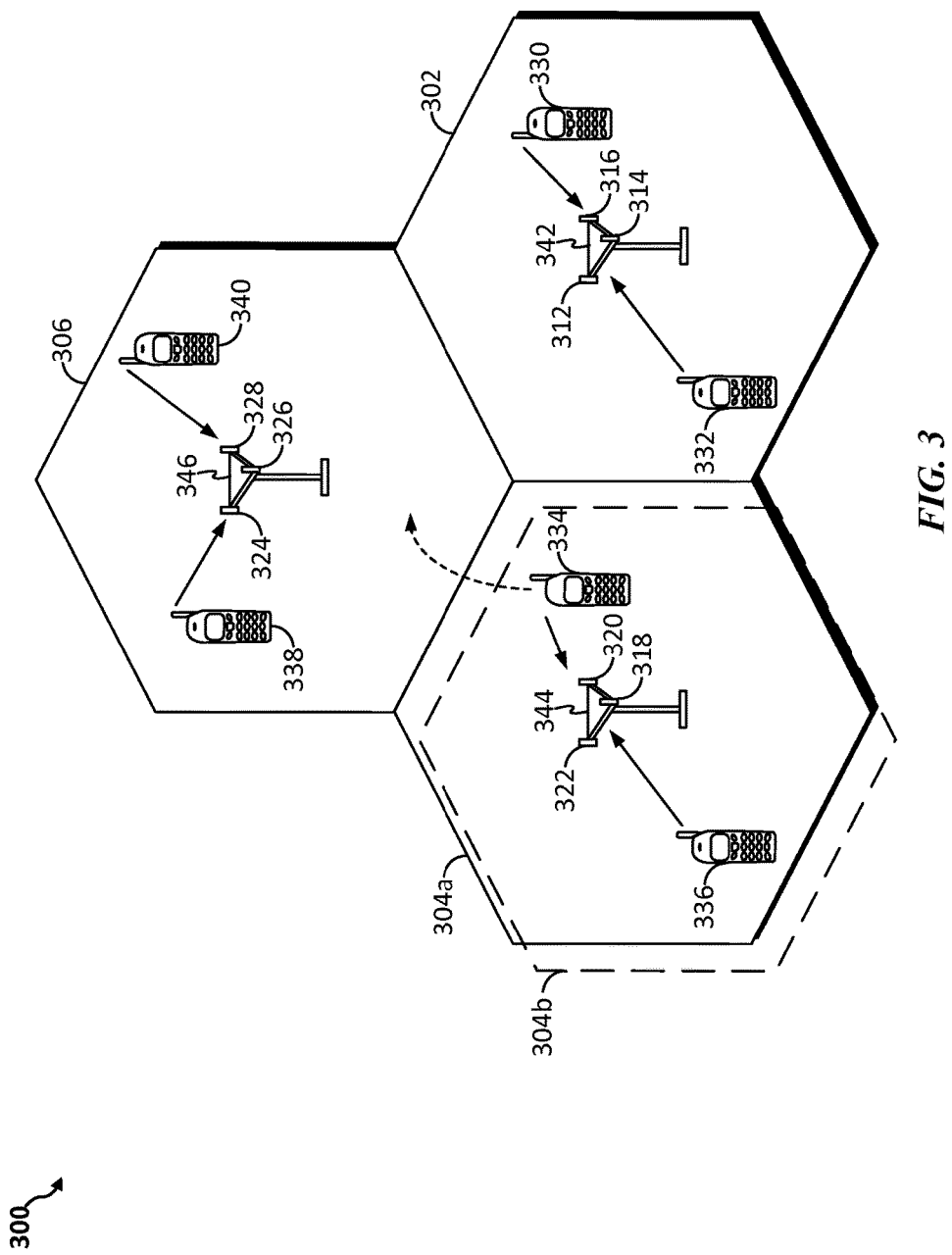
FIG. 3 is a conceptual diagram illustrating an example of an access network.

FIG. 3 is a simplified schematic illustration of a RAN 300 in a UTRAN architecture. The system includes multiple cellular regions (cells), including cells 302, 304, and 306, each of which may include one or more sectors. Cells may be defined geographically (e.g., by coverage area) and/or may be defined in accordance with a frequency, scrambling code, etc. That is, the illustrated geographically-defined cells 302, 304, and 306 may each be further divided into a plurality of cells, e.g., by utilizing different scrambling codes. For example, cell 304a may utilize a first scrambling code, and cell 304b, while in the same geographic region and served by the same Node B 344, may be distinguished by utilizing a second scrambling code.

In a cell that is divided into sectors, the multiple sectors within a cell can be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 may each correspond to a different sector. In cell 306, antenna groups 324, 326, and 328 may each correspond to a different sector.

The cells 302, 304, and 306 may include several UEs that may be in communication with one or more sectors of each cell 302, 304, or 306. For example, UEs 330 and 332 may be in communication with Node B 342, UEs 334 and 336 may be in communication with Node B 344, and UEs 338 and 340 may be in communication with Node B 346. Here, each Node B 342, 344, and 346 may be configured to provide an access point to a core network 204 (see FIG. 2) for all the UEs 330, 332, 334, 336, 338, and 340 in the respective cells 302, 304, and 306.

During a call with a source cell, or at any other time, the UE 336 may monitor various parameters of the source cell as well as various parameters of neighboring cells. Further, depending on the quality of these parameters, the UE 336 may maintain communication with one or more of the neighboring cells. During this time, the UE 336 may maintain an Active Set, that is, a list of cells to which the UE 336 is simultaneously connected (i.e., the UTRAN cells that are currently assigning a downlink dedicated physical channel DPCH or fractional downlink dedicated physical channel F-DPCH to the UE 336 may constitute the Active Set).

The UTRAN air interface may comprise a spread spectrum Direct-Sequence Code Division Multiple Access (DS-CDMA) system and, in one example, may conform or comply with W-CDMA standards. A spread spectrum DS-CDMA may spread user data through multiplication by a sequence of pseudorandom bits called chips. The W-CDMA air interface for the UTRAN 202 may be based on such DS-CDMA technology and may additionally employ frequency division duplexing (FDD) that uses a different carrier frequency for the uplink (UL) and downlink (DL) between a Node B 408 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles are equally applicable to a TD-SCDMA air interface or any other suitable air interface.

In a wireless telecommunication system, the communication protocol architecture may take on various forms depending on the particular application. For example, in a 3GPP UMTS system, the signaling protocol stack is divided into a Non-Access Stratum (NAS) and an Access Stratum (AS). The NAS provides the upper layers, for signaling between the UE 210 and the core network 204 (referring to FIG. 2), and may include circuit switched and packet switched protocols. The AS provides the lower layers, for signaling between the UTRAN 202 and the UE 210, and may include a user plane and a control plane. Here, the user plane or data plane carries user traffic, while the control plane carries control information (i.e., signaling).

Figure 4:
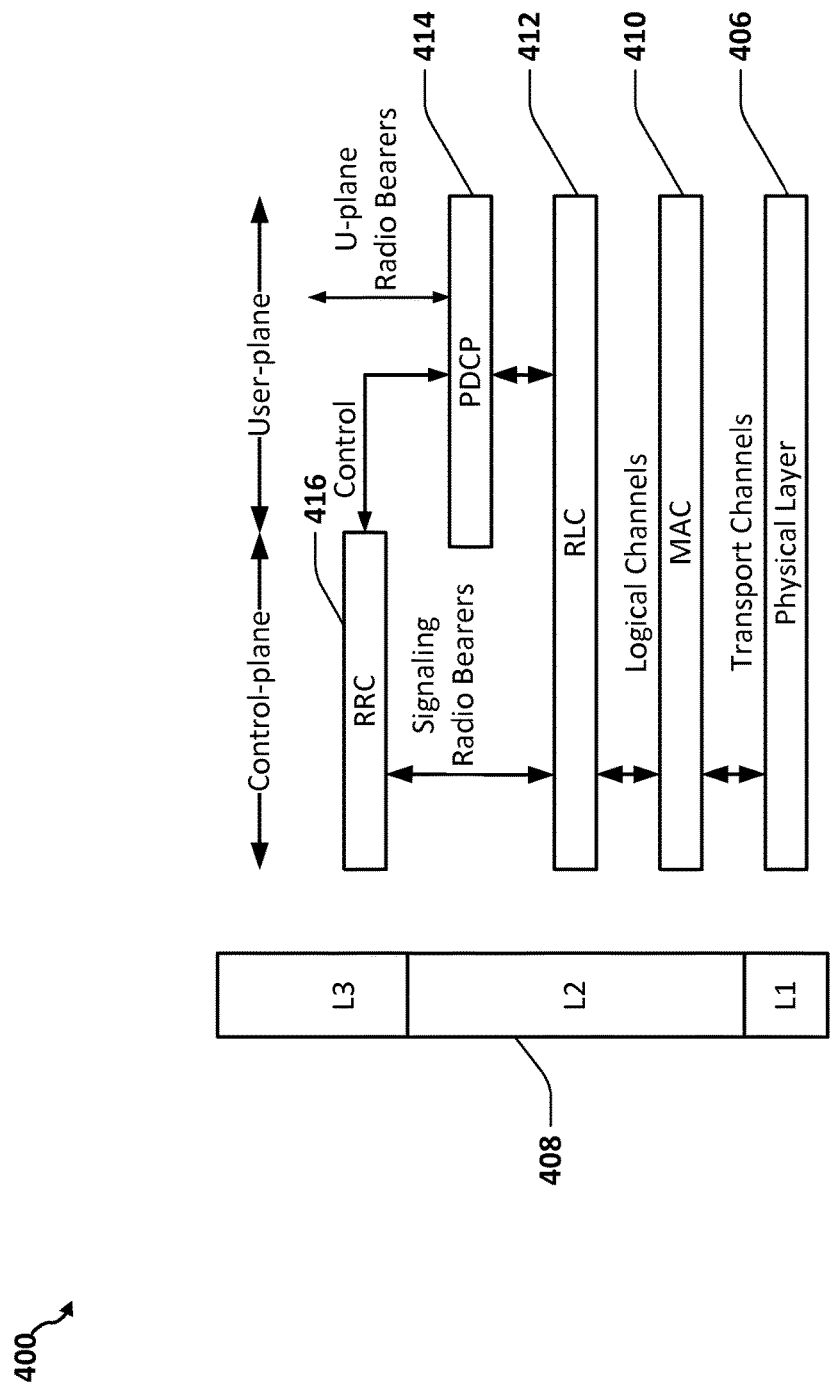
FIG. 4 is a conceptual diagram illustrating an example of a radio protocol architecture for the user and control plane.

Turning to FIG. 4, the AS is shown with three layers: Layer 1, Layer 2, and Layer 3. Layer 1 is the lowest layer and implements various physical layer signal processing functions. Layer 1 will be referred to herein as the physical layer 406. The data link layer, called Layer 2 408, is above the physical layer 406 and is responsible for the link between the UE 210 and Node B 208 over the physical layer 406.

At Layer 3, the RRC layer 416 handles the control plane signaling between the UE 210 and the Node B 208. RRC layer 416 includes a number of functional entities for routing higher layer messages, handling broadcasting and paging functions, establishing and configuring radio bearers, etc.

In the illustrated air interface, the L2 layer 408 is split into sublayers. In the control plane, the L2 layer 408 includes two sublayers: a medium access control (MAC) sublayer 410 and a radio link control (RLC) sublayer 412. In the user plane, the L2 layer 408 additionally includes a packet data convergence protocol (PDCP) sublayer 414. Although not shown, the UE may have several upper layers above the L2 layer 408 including a network layer (e.g., IP layer) that is terminated at a PDN gateway on the network side and an application layer that is terminated at the other end of the connection (e.g., far end UE, server, etc.).

The PDCP sublayer 414 provides multiplexing between different radio bearers and logical channels. The PDCP sublayer 414 also provides header compression for upper layer data packets to reduce radio transmission overhead, security by ciphering the data packets, and handover support for UEs between Node Bs.

The RLC sublayer 412 generally supports an acknowledged mode (AM) (where an acknowledgment and retransmission process may be used for error correction), an unacknowledged mode (UM), and a transparent mode for data transfers, and provides segmentation and reassembly of upper layer data packets and reordering of data packets to compensate for out-of-order reception due to a hybrid automatic repeat request (HARQ) at the MAC layer. In the acknowledged mode, RLC peer entities such as an RNC and a UE may exchange various RLC protocol data units (PDUs) including RLC Data PDUs, RLC Status PDUs, and RLC Reset PDUs, among others. In the present disclosure, the term "packet" may refer to any RLC PDU exchanged between RLC peer entities.

The MAC sublayer 410 provides multiplexing between logical and transport channels. The MAC sublayer 410 is also responsible for allocating the various radio resources (e.g., resource blocks) in one cell among the UEs. The MAC sublayer 410 is also responsible for HARQ operations.

Figure 5:
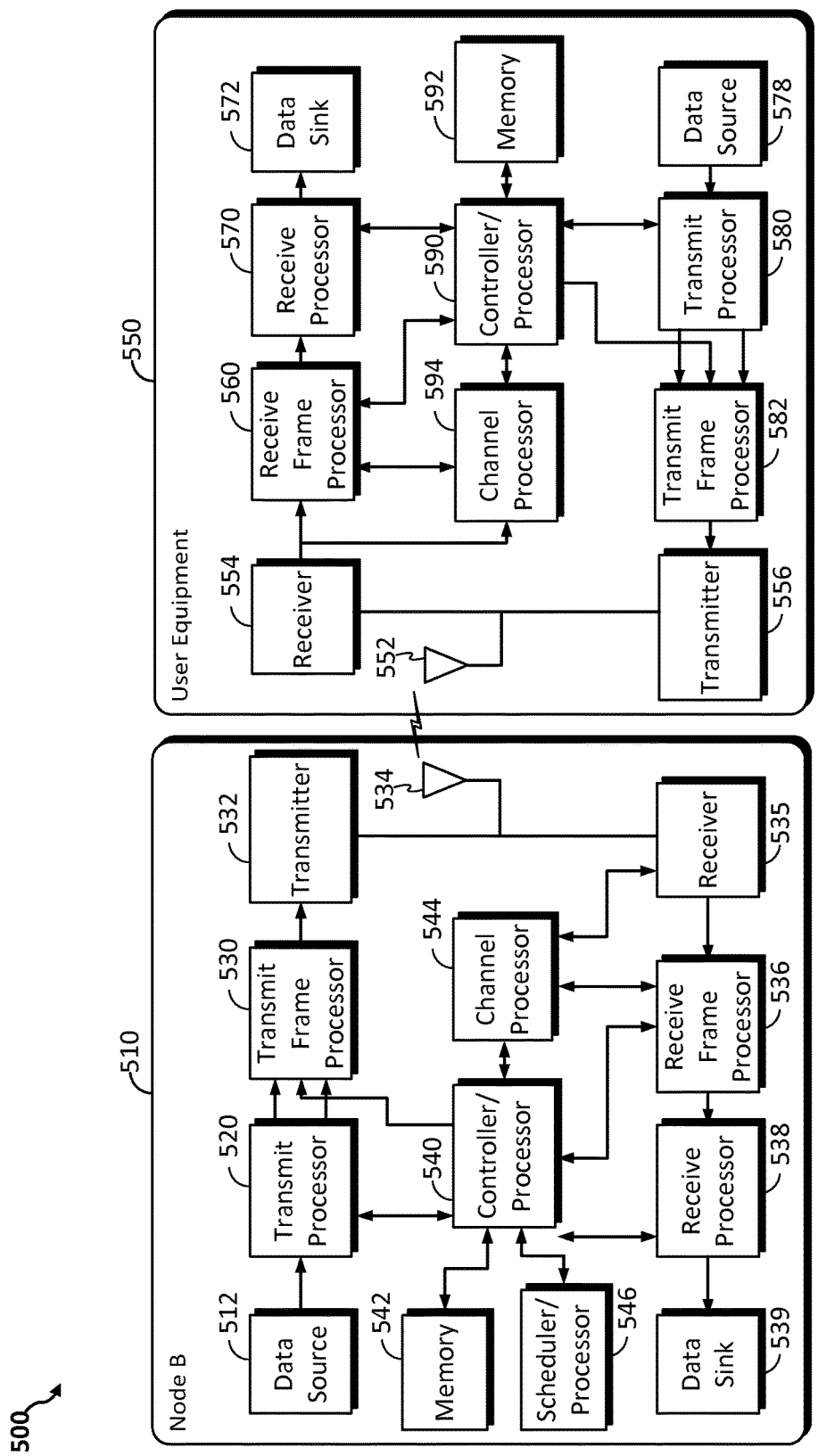
FIG. 5 is a block diagram conceptually illustrating an example of a Node B in communication with a UE in a telecommunications system.

FIG. 5 is a block diagram of an exemplary Node B 510 in communication with an exemplary UE 550, where the Node B 510 may be the Node B 408 in FIG. 4, and the UE 550 may be the UE 410 in FIG. 4. In the downlink communication, a transmit processor 520 may receive data from a data source 512 and control signals from a controller/processor 540. The transmit processor 520 provides various signal processing functions for the data and control signals, as well as reference signals (e.g., pilot signals). For example, the transmit processor 520 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 544 may be used by a controller/processor 540 to determine the coding, modulation, spreading, and/or scrambling schemes for the transmit processor 520. These channel estimates may be derived from a reference signal transmitted by the UE 550 or from feedback from the UE 550. The symbols generated by the transmit processor 520 are provided to a transmit frame processor 530 to create a frame structure. The transmit frame processor 530 creates this frame structure by multiplexing the symbols with information from the controller/processor 540, resulting in a series of frames. The frames are then provided to a transmitter 532, which provides various signal conditioning functions including amplifying, filtering, and modulating the frames onto a carrier for downlink transmission over the wireless medium through antenna 534. The antenna 534 may include one or more antennas, for example, including beam steering bidirectional adaptive antenna arrays or other similar beam technologies.

At the UE 550, a receiver 554 receives the downlink transmission through an antenna 552 and processes the transmission to recover the information modulated onto the carrier. The information recovered by the receiver 554 is provided to a receive frame processor 560, which parses each frame, and provides information from the frames to a channel processor 594 and the data, control, and reference signals to a receive processor 570. The receive processor 570 then performs the inverse of the processing performed by the transmit processor 520 in the Node B 510. More specifically, the receive processor 570 descrambles and despreads the symbols, and then determines the most likely signal constellation points transmitted by the Node B 510 based on the modulation scheme. These soft decisions may be based on channel estimates computed by the channel processor 594. The soft decisions are then decoded and deinterleaved to recover the data, control, and reference signals. The CRC codes are then checked to determine whether the frames were successfully decoded. The data carried by the successfully decoded frames will then be provided to a data sink 572, which represents applications running in the UE 550 and/or various user interfaces (e.g., display). Control signals carried by successfully decoded frames will be provided to a controller/processor 590. When frames are unsuccessfully decoded by the receiver processor 570, the controller/processor 590 may also use an acknowledgement (ACK) and/or negative acknowledgement (NACK) protocol to support retransmission requests for those frames.

In the uplink, data from a data source 578 and control signals from the controller/processor 590 are provided to a transmit processor 580. The data source 578 may represent applications running in the UE 550 and various user interfaces (e.g., keyboard). Similar to the functionality described in connection with the downlink transmission by the Node B 510, the transmit processor 580 provides various signal processing functions including CRC codes, coding and interleaving to facilitate FEC, mapping to signal constellations, spreading with OVSFs, and scrambling to produce a series of symbols. Channel estimates, derived by the channel processor 594 from a reference signal transmitted by the Node B 510 or from feedback contained in the midamble transmitted by the Node B 510 may be used to select the appropriate coding, modulation, spreading, and/or scrambling schemes. The symbols produced by the transmit processor 580 will be provided to a transmit frame processor 582 to create a frame structure. The transmit frame processor 582 creates this frame structure by multiplexing the symbols with information from the controller/processor 590, resulting in a series of frames. The frames are then provided to a transmitter 556, which provides various signal conditioning functions including amplification, filtering, and modulating the frames onto a carrier for uplink transmission over the wireless medium through the antenna 552.

The uplink transmission is processed at the Node B 510 in a manner similar to that described in connection with the receiver function at the UE 550. A receiver 535 receives the uplink transmission through the antenna 534 and processes the transmission to recover the information modulated onto the carrier. The information recovered by the receiver 535 is provided to a receive frame processor 536, which parses each frame, and provides information from the frames to the channel processor 544 and the data, control, and reference signals to a receive processor 538. The receive processor 538 performs the inverse of the processing performed by the transmit processor 580 in the UE 550. The data and control signals carried by the successfully decoded frames may then be provided to a data sink 539 and the controller/processor, respectively. If some of the frames were unsuccessfully decoded by the receive processor, the controller/processor 540 may also use an acknowledgement (ACK) and/or negative acknowledgement (NACK) protocol to support retransmission requests for those frames.

The controller/processors 540 and 590 may be used to direct the operation at the Node B 510 and the UE 550, respectively. For example, the controller/processors 540 and 590 may provide various functions including timing, peripheral interfaces, voltage regulation, power management, and other control functions. The computer readable media of memories 542 and 592 may store data and software for the Node B 510 and the UE 550, respectively. A scheduler/processor 546 at the Node B 510 may be used to allocate resources to the UEs and schedule downlink and/or uplink transmissions for the UEs.

According to certain aspects of the present disclosure, one or more of the CBC 250, the RNC 206, and/or the Node B 208 may be configured to transmit a Cell Broadcast Message having scheduling information as described below. In some aspects of the present disclosure the UE 210 may be configured to receive and parse a Cell Broadcast Message having scheduling information as described below. In particular, in a UE 550, a processor 590 may be configured to receive and parse the Cell Broadcast Message in accordance with the description below. Furthermore, in various aspects of the disclosure, at least one processor such as in the processing system 114 may be utilized to implement one or more of the processes or functions described below.

Cell Broadcast (CB) service is a feature supported in GSM and UMTS technologies, as defined by the 3GPP standards body. Cell Broadcast service information may be transmitted from a Cell Broadcast Center 250 to nearby UEs 210, and typically includes information such as the name of the city/region where the cell is located, which may then be visualized on the display of a UE 210. Typically, CB messages are transmitted to the cell over a cell broadcast channel (CBCH) at 1.88-second intervals.

For the GSM standard, 3GPP TS 44.012, revision 8.8.0, titled "Short Message Service Cell Broadcast (SMSCB) support on the mobile radio interface" and incorporated herein by reference in its entirety, describes the SMS Cell Broadcast Service, as it is implemented in a conventional GSM system according to Rev. 8 standards. The SMS Cell Broadcast service is designed to minimize the battery usage requirements for a UE 210. The UE 210 can read the first part of a CB message and then decide whether or not to read the remainder of the message. In addition, the network may broadcast Schedule Messages, providing information in advance about the CB messages that will be sent immediately afterwards. The UE 210 may use this scheduling information to restrict reception to those messages relevant to the UE 210.

CB-DRX is a more recent development for Cell Broadcast messaging, enabling a reduction in receiver power usage at the UE 210 in the cell that receives the CB messages. With CB-DRX, rather than listening to the CBCH at each 1.88-second interval, a Schedule Message provides a schedule for CB messaging, such that the UE 210 can listen to the CBCH more infrequently. The Schedule Message provides scheduling for a predetermined Schedule Period, e.g., including the next 48 slots, for the reading of the CBCH. By utilizing the information in the Schedule Message, the UE 210 may determine which slots on the CBCH carry information for the cell.

One issue with conventional CB-DRX is that if a UE 210 fails to read the Schedule Message, the UE 210 thereafter is generally required to read the CBCH at every 1.88-second interval through all 48 slots, as in non-DRX CB messaging, until it successfully receives a Schedule Message from the network. This scenario can result in a relatively high power consumption and premature battery drain, and essentially frustrates the main purpose of CB-DRX. Furthermore, this scenario can cause page messages directed to the UE 210 to be missed. This problem can become exacerbated in the case of a dual SIM dual standby UE 210, which may be configured to read the CBCH every 1.88 seconds on both subscriptions, thereby causing a potentially large number of missed pages. Schedule Messages may be missed during cell reselections and during voice calls, for example.

The SMSCB DRX Schedule Message transmitted by a network typically includes information regarding a plurality of consecutive CB messages that are scheduled or planned to immediately follow the Schedule Message. For optimum DRX, a new Schedule Message may follow the last message sent in a Schedule Period. Schedule Messages are sent on basic and extended CBCH independently. When no information is known about a CB message, because no Schedule Message has been received related to the CB message, the UE 210 typically reads at least the first part of the CB message.

According to certain aspects of the present disclosure, a CB Message may be adapted to carry information relating to a schedule for a subsequent CB Message. This information is additional scheduling information that may complement scheduling information provided in a Schedule Message. If a UE 210 fails to receive the Schedule Message, it may determine one or more future time slots in which a subsequent CB Message relevant to the UE 210 may be received. If the UE 210 misses a first Schedule Message, it need not listen to all remaining slots of the 48 slots defined in a Scheduling Period for the next Schedule Message. Rather, the UE 210 typically receives the next CB Message in order to retrieve schedule information corresponding to one or more subsequent CB Messages. The next CB Message may be transmitted in the next slot or in a subsequent slot. Accordingly, the UE 210 may read the CBCH every 1.88 seconds until it receives at least one CB Message. In the next CB Message, the UE 210 may obtain the information indicating when the UE 210 should wake up again to read the CBCH. Thus, certain aspects of the present disclosure enable power savings relative to a conventional CB-DRX-enabled UE 210.

Figure 6:
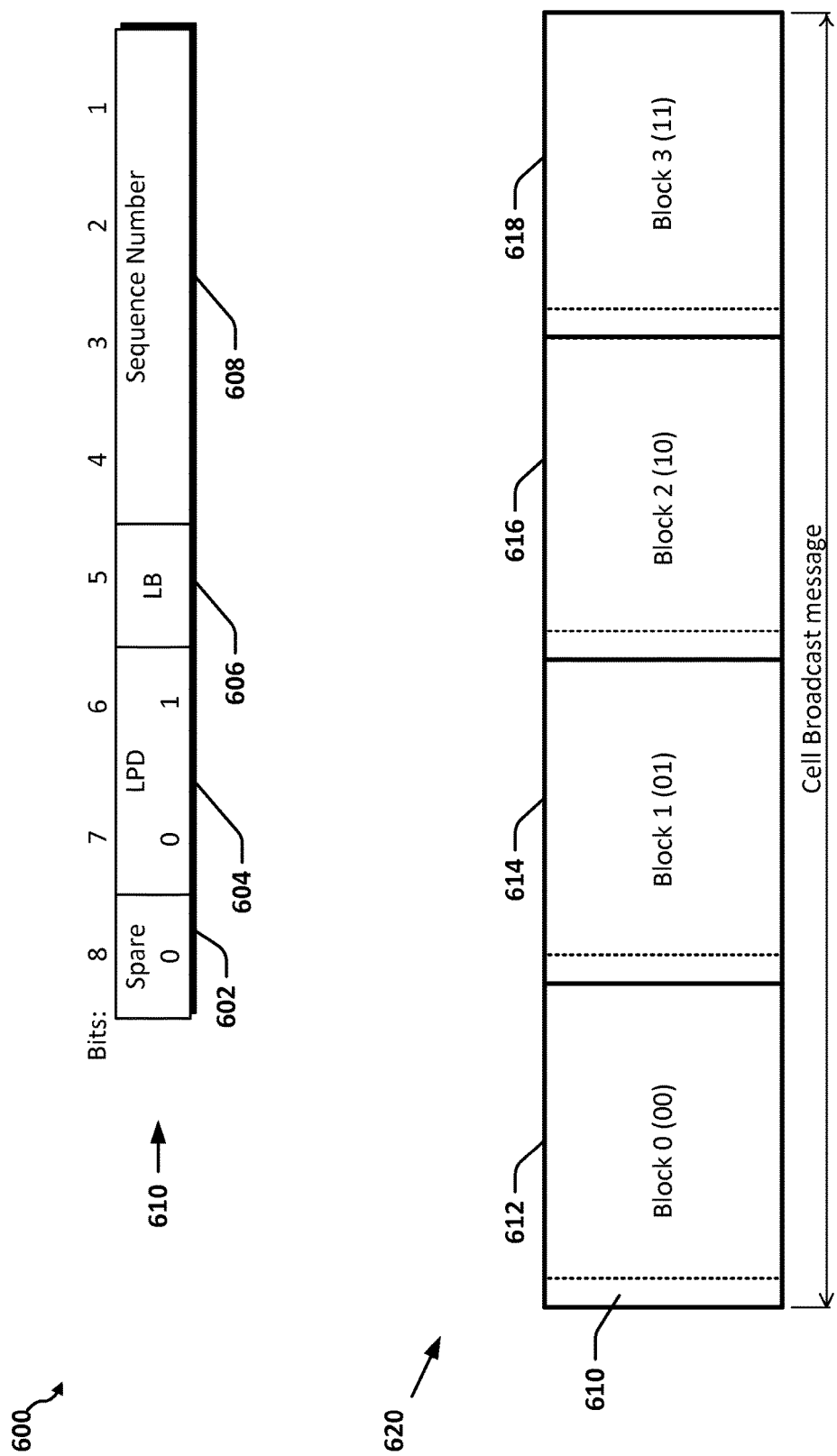
FIG. 6 is a schematic diagram of a cell broadcast message according to one example.

FIG. 6 is a schematic illustration 600 including a CB Message 620 according to some aspects of the present disclosure. The CB Message 620 may comprise a plurality of blocks 612, 614, 616 and 618 and each block may comprise a first octet 610 that serves as at least a portion of a header. In the example depicted, the CB Message 620 comprises 4 blocks 612, 614, 616 and 618, each block 612, 614, 616 and 618 having 23 octets, of which the first octet 610 of each block comprises a Block Type. Thus, the first octet 610 of the block in each CB Message 620 comprises a Block Type octet 610 that may identify the function of the block 612, 614, 616 or 618, and certain other attributes of the CB Message 620.

As depicted in FIG. 6, the first octet 610 comprises a sequence number field 608, a last block (LB) field 606, a Link Protocol Discriminator (LPD) field 604 and a spare field 602. Bits 1 and 2 of the octet 610, which are part of the sequence number field 608, are used to indicate which of four blocks is being received, and bit 4 of the octet 610 may be set to binary 1 when the block belongs to a Schedule Message, and for the purpose of indicating that the block is part of a Schedule Message. The LB field 66 is used to indicate the last block of a CB Message 620 that comprises SMS Cell Broadcast information. The LPD takes the value "0 1" for CB Messages 620, and other values of LPD indicate other protocols which may cause the CB Message 620 to be ignored when the CB LPD is expected.

In an aspect of the present disclosure, the field 602 (bit 8 of the octet 610) may be utilized as an indicator to the UE 210 that additional schedule information is included in the CB Message 620. In one example, the UE 210 may parse the CB Message 620 to determine the schedule information for the next CB Message (not shown) if bit 8 of the first octet 610 is set to binary 1. In conventional systems, bit 8 of the octet 610 is a spare bit that is generally set to zero by the sender and ignored by a conventional receiver. Messages are typically not rejected if this field 602 is assigned a non-zero value.

According to certain aspects of the present disclosure, a Page Parameter may be utilized to explicitly indicate the occurrence of the next CB Message. The Page Parameter may be an element of a 6-octet CB Message Header. In one example, the Page Parameter may indicate the number of slots that will pass before the network is to send the next CB Message relevant to the UE 210. The Page Parameter may be coded as two 4-bit fields. The first field (bits 0-3) may indicate the binary value of the total number of pages in a CB Schedule message, and the second field (bits 4-7) may indicate a specific page number within that sequence. In one example, the coding may start at 0001, with a setting of 0000 being reserved. If a UE 210 receives the code 0000 in either the first field or the second field, then the UE 210 may treat the CB Schedule Message in the same manner that it treats a CB Schedule Message with a page parameter 0001 0001 (i.e., a single page message).

In certain embodiments, the first field or the second field of a Page Parameter may be set to the value 0000 to indicate that the UE 210 may find scheduling information in the CB Message. In this way, existing functionality of conventional UEs is not affected. The content of the scheduling information within the CB Message may be included in any suitable octet within the CB Message. For example, the scheduling information may be transmitted in a predetermined octet within the CB Message 620, at a bit position known to both the receiving UE 210 and a transmitting entity such as the CBC 250, the RNC 206, and/or the Node B 208.

Figure 7:
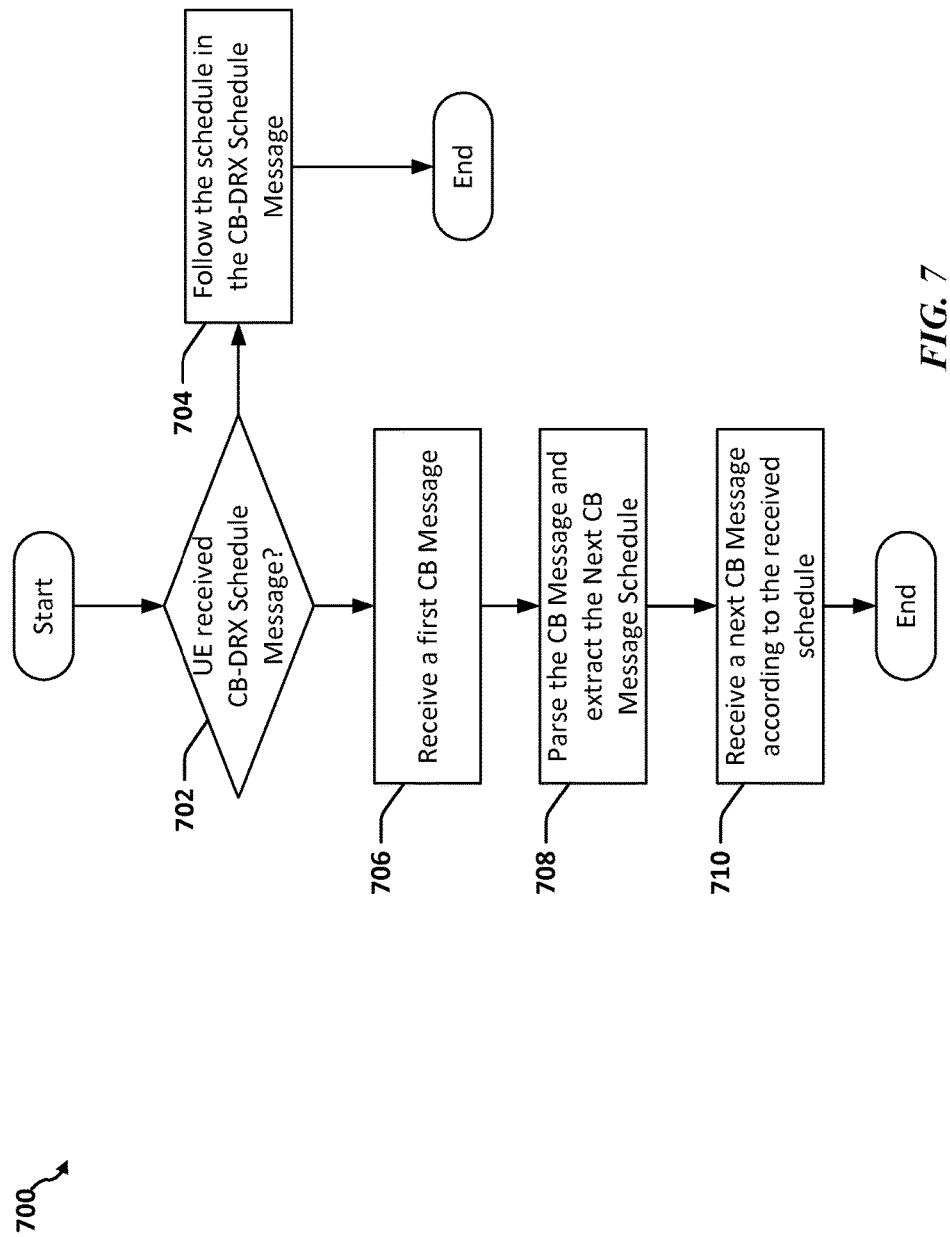
FIG. 7 is a flow chart illustrating one example of a process for receiving cell broadcast messages.

FIG. 7 is a flow chart illustrating a process 700 of receiving Cell Broadcast Messages in accordance with an aspect of the present disclosure. In various aspects, the process 700 may be implemented by the UE 550, e.g., by utilizing one or more of the receiver 554, processor 590, or any other suitable block within the UE 550.

At step 702, the UE 550 may determine if it received a CB-DRX Schedule Message. As described above, the CB-DRX Schedule Message is a conventional message that provides scheduling for the Schedule Period for the reading of the CBCH. If the UE 550 received the CB-DRX Schedule Message, then at step 704, the UE 550 may follow the schedule provided in the received message. In this way, conventional CB-DRX may be implemented.

If, however, at step 702 the UE 550 did not receive the CB-DRX Schedule Message, then at step 706, the UE 550 may receive a first CB Message. At step 708, the UE 550 may parse the first CB Message and extract schedule information indicating a next Cell Broadcast Message, e.g., identifying one or more slots that may carry the Cell Broadcast Message information. Thus, in block 710, the UE 550 may receive the Cell Broadcast Message according to the schedule extracted in block 708.

Figure 8:
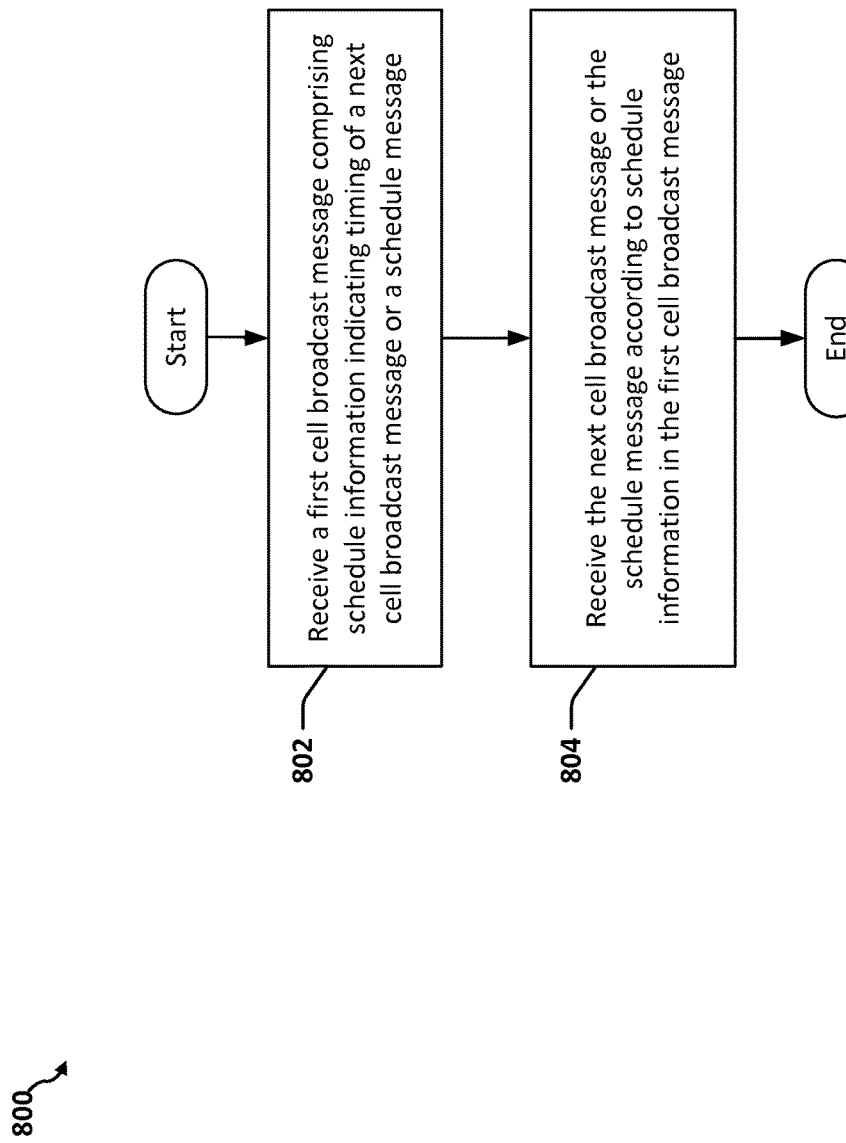
FIG. 8 is a flow chart illustrating one example of a process for transmitting cell broadcast messages.

FIG. 8 is a flow chart illustrating a method for receiving CB Messages in accordance with certain aspects of the present disclosure. The method 800 may be performed by the UE 550, and my employ one or more of the receiver 554, processor 590, or any other suitable block within the UE 550.

At step 802, the UE 550 may receive a first cell broadcast message. The first cell broadcast message may comprise schedule information indicating timing of a next cell broadcast message or a schedule message. The UE 550 may monitor a communications link in order to receive the first CB Message. The first CB Message may comprise schedule information indicating timing of a next CB message or a Schedule Message. The first CB message may be received before timing information associated with a CB channel is known. The first CB message may be received after a reselection procedure or after termination of a voice call. The Schedule Message may be received and may include timing information for one or more subsequent CB Messages during a scheduling period. In some embodiments, one or more subsequent CB Messages may be received in accordance with the timing information included in the Schedule Message. The next CB Message or the Schedule Message may be received by monitoring a CB channel at intervals defined by the schedule information in the first CB Message. The first CB message may be received by periodically reading a CB channel until the first CB Message is received. The first CB Message may be identified in a block type octet in the first cell broadcast message.

At step 804, the UE 550 may receive the next cell broadcast message or the schedule message according to the schedule information in the first cell broadcast message. The UE 550 may parse the first CB Message and extract schedule information indicating the expected timing of next CB Message. In one example, the schedule information may identify one or more slots that carry the CB Message information.

The schedule information in the first CB Message may relate to a DRX schedule defined in a previously missed Schedule Message. The schedule information may have been adapted to identify a slot configured to carry the next CB Message. The schedule information may have been adapted to identify a slot configured to carry the Schedule Message. The presence of the schedule information in the first CB Message may be indicated in a page parameter of a header of the first CB Message.

Figure 9:
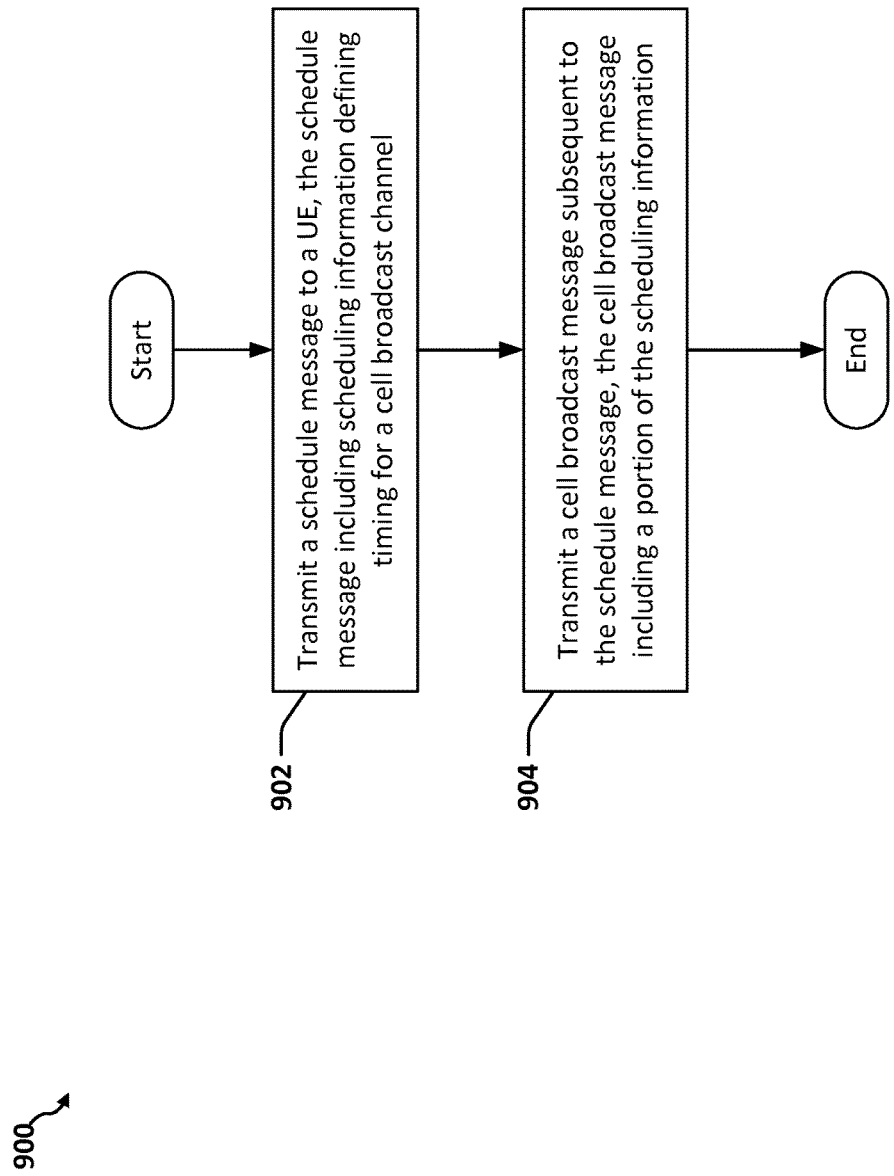
FIG. 9 is a flow chart illustrating a process of transmitting CB Messages in accordance with certain aspects of the present disclosure.

FIG. 9 is a flow chart illustrating a process 900 of transmitting CB Messages in accordance with certain aspects of the present disclosure. The process 700 may be implemented by network entity such as the Node B 510, which may utilize, for example, one or more of the transmitter 532, processor 540, or any other suitable block within the Node B 510.

At step 902, the Node B 510 may transmit a Schedule Message to a UE 550. The Schedule Message may include scheduling information defining timing for a cell broadcast channel. The scheduling information may define one or more timing slots allocated to carry one or more CB Messages for the UE 550. The scheduling information may define a DRX schedule for the CB channel.

At step 904, the Node B 510 may transmit the CB Message subsequent to the Schedule Message. The CB Message may include a portion of the scheduling information transmitted in the Schedule Message. The Node B 510 may adapt the CB Message to include the portion of scheduling information. The portion of the scheduling information may define a slot in the CB channel that is allocated to carry a next CB Message for the UE 550. The portion of the scheduling information may be adapted to identify a slot allocated to carry a next Schedule Message for the UE. The CB Message may be adapted to include an indicator of presence of scheduling information in a header of the cell broadcast message. The indicator may be provided in a block type octet or in a page parameter field.

Figure 10:
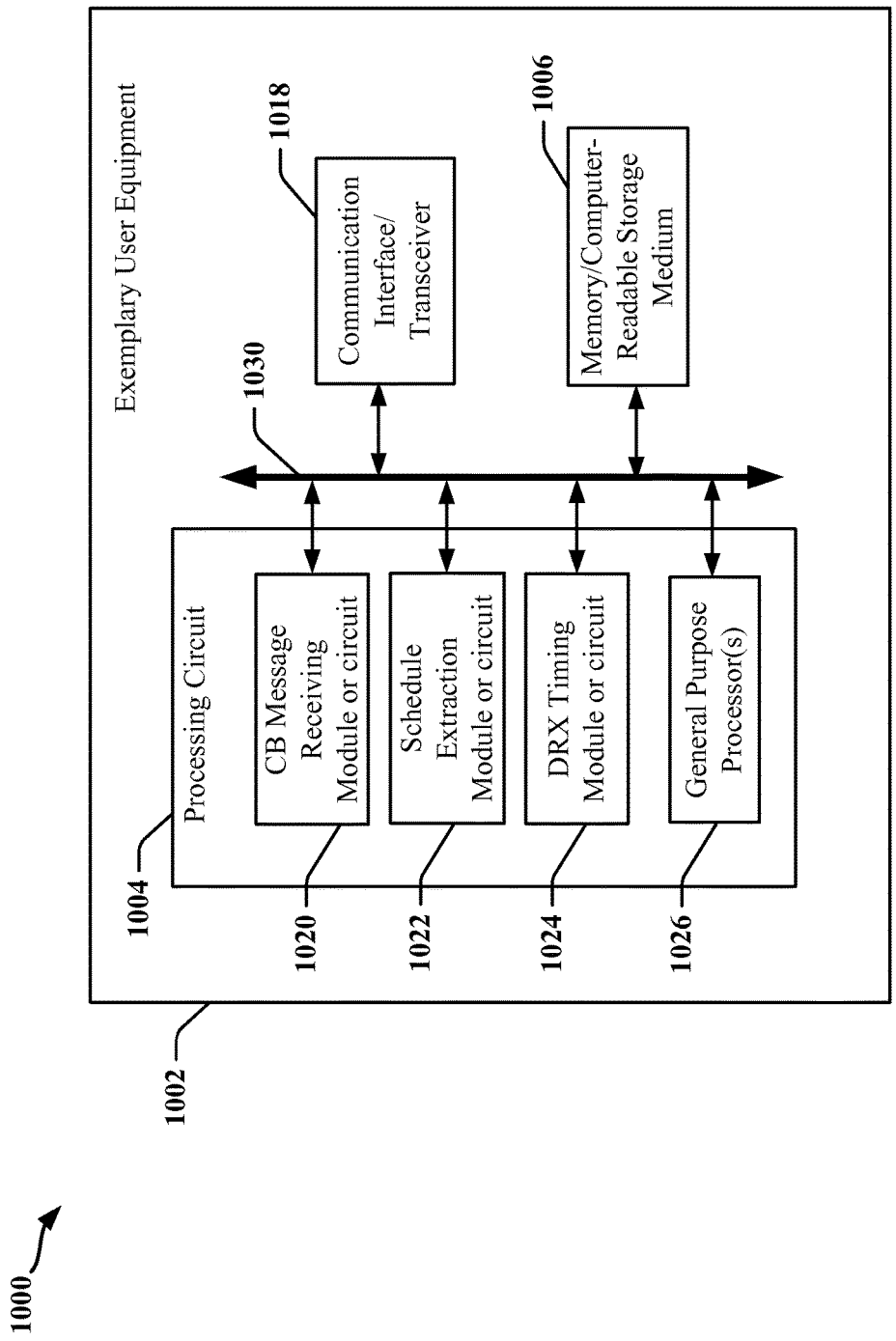
FIG. 10 is a diagram illustrating an example of a hardware implementation for an exemplary user equipment apparatus employing a processing circuit.

FIG. 10 is a diagram 1000 illustrating an example of a hardware implementation for an exemplary user equipment apparatus 1002 employing a processing circuit 1004. The apparatus 1002 may comprise a UE 550 and may employ one or more of a receiver 554-processor 590, memory 592 and other circuits or modules to perform certain of the functions described herein. The processing circuit 1004 may be implemented with a bus architecture, represented generally by the bus 1030. The bus 1030 may include any number of interconnecting buses and bridges depending on the application and attributes of the processing circuit 1004 and overall design constraints. The bus 1030 may link together various circuits including general-purpose processors 1026 and/or one or more processors 560, 570, 590, 594, 580, 582, and/or other hardware modules 554, 556, 572, 578 that perform specific functions, as well as the computer-readable storage medium 1006, which may comprise one or more of memory 592, data source 578 and data sink 572. The bus 1030 may also link various other circuits such as timing sources, peripherals, voltage regulators, and power management circuits, which are well known in the art, and therefore, will not be described any further.

The processing circuit 1004 may be coupled to one or more transceivers, which may comprise receiver 554 and transmitter 556 and/or other related circuits and modules. The one or more transceivers 1018 may be used for communications between UE 550 and one or more entities 510 of a network.

The processing circuit 1004 may include one or more processors 1026, 560, 570, 590, 594, 580, 582, which may be responsible for certain general processing tasks, including the execution of software stored on the computer-readable storage medium 1006. The software, when executed by the one or more processors 1026, 560, 570, 590, 594, 580, 582, may cause the processing circuit 1004 to perform the various functions described supra for any particular apparatus. The computer-readable storage medium 1006 may also be used for storing data that is manipulated by the processing circuit 1004 when executing software.

The processing circuit 1004 further includes at least one of the modules 1020, 1022 and 1024. The modules 1020, 1022 and 1024 may be software modules running on the processing circuit 1004, resident/stored in the computer readable storage medium 1006, one or more hardware modules coupled to the processing circuit 1004, or some combination thereof. In one configuration, the apparatus 1002 for wireless communication includes means 1020 for receiving CB Messages and Schedule Messages, means 1022 for extracting schedule information from a CB Message, and means 1024 for determining DRX timing information for the apparatus 1002 based on the extracted schedule information.

Figure 11:
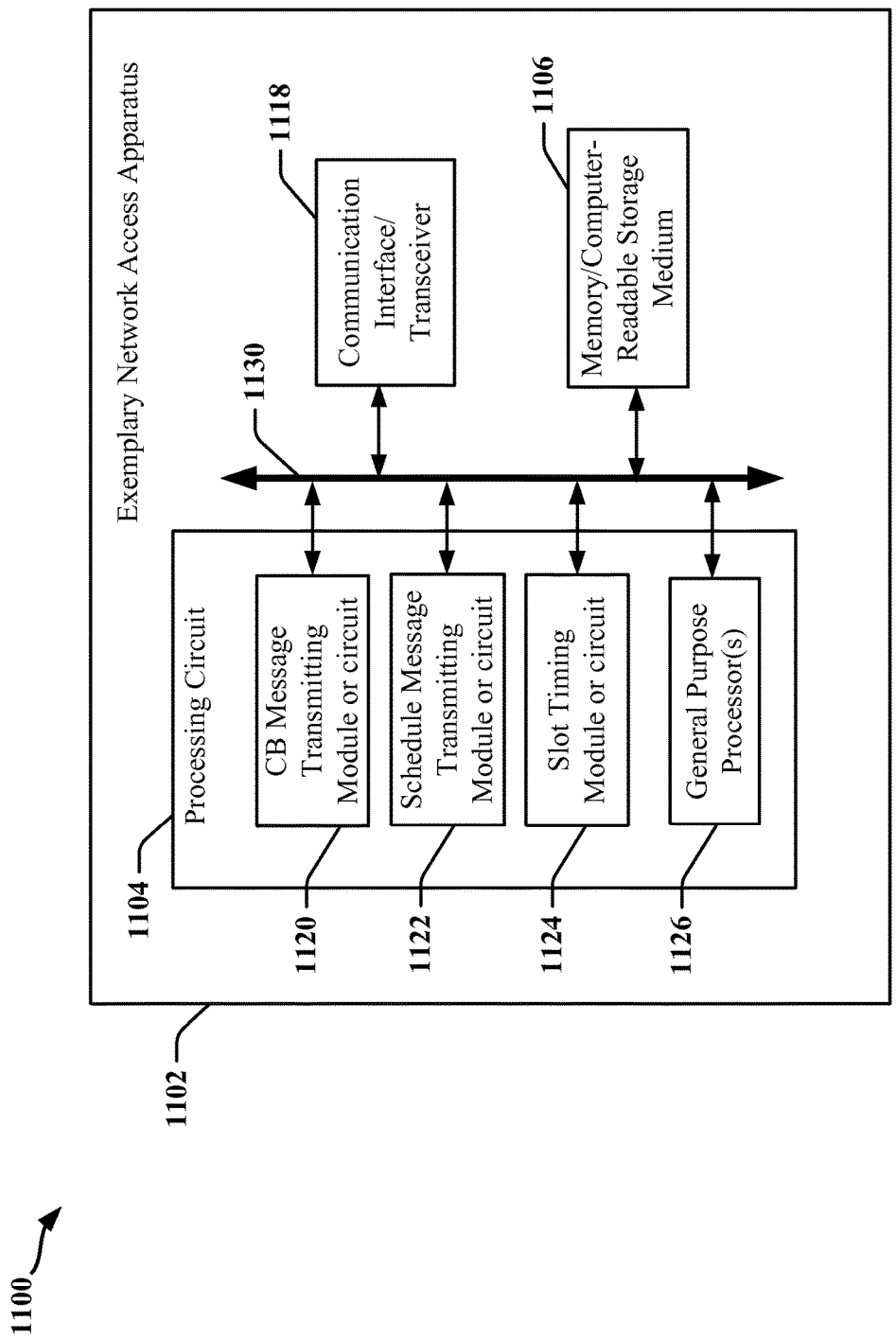
FIG. 11 is a diagram illustrating an example of a hardware implementation for an exemplary network access apparatus employing a processing circuit.

FIG. 11 is a diagram 1100 illustrating an example of a hardware implementation for an exemplary network access apparatus 1102 employing a processing circuit 1104. The network access apparatus 1102 may comprise a CBC 250, an RNC 206, or a Node B 208. In the example of a Node B, the apparatus 1102 may employ one or more of a receiver 535, processor 540, memory or other storage 542 and other circuits or modules to perform certain of the functions described herein. The processing circuit 1104 may be implemented with a bus architecture, represented generally by the bus 1130. The bus 1130 may include any number of interconnecting buses and bridges depending on the application and attributes of the processing circuit 1104 and overall design constraints. The bus 1130 may link together various circuits including general-purpose processors 1126 and/or one or more processors 520, 530, 540, 544, 536, 538, and/or other hardware modules 512, 532, 546, 539, 535 that perform specific functions, as well as the computer-readable storage medium 1106, which may comprise one or more of memory 542, data source 512 and data sink 539. The bus 1130 may also link various other circuits such as timing sources, peripherals, voltage regulators, and power management circuits, which are well known in the art, and therefore, will not be described any further.

The processing circuit 1104 may be coupled to one or more transceivers, which may comprise receiver 554 and transmitter 556 and/or other related circuits and modules. The one or more communications interfaces and/or transceivers 1118 may be used for communications between UE 550 and one or more entities 510 of a network.

The processing circuit 1104 may include one or more processors 1126, 560, 570, 590, 594, 580, 582, which may be responsible for certain general processing tasks, including the execution of software stored on the computer-readable storage medium 1106. The software, when executed by the one or more processors 1126, 560, 570, 590, 594, 580, 582, may cause the processing circuit 1104 to perform the various functions described supra for any particular apparatus. The computer-readable storage medium 1106 may also be used for storing data that is manipulated by the processing circuit 1104 when executing software.

The processing circuit 1104 further includes at least one of the modules 1120, 1122 and 1124. The modules 1120, 1122 and 1124 may be software modules running on the processing circuit 1104, resident/stored in the computer readable storage medium 1106, one or more hardware modules coupled to the processing circuit 1104, or some combination thereof. In one configuration, the apparatus 1102 for wireless communication includes means 1120 for transmitting CB Messages to the UE 550, means 1122 for transmitting Schedule Messages to the UE 550, means 1124 for determining slot timing information for the cell.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. A method of wireless communication, comprising:
receiving a first cell broadcast message, the first cell broadcast message comprising schedule information indicating timing of a next cell broadcast message or a next schedule message, wherein the schedule information of the first cell broadcast message includes at least a portion of schedule information also provided in a separate schedule message; and
receiving the next cell broadcast message or the next schedule message according to the schedule information in the first cell broadcast message.

2. The method of claim 1, wherein the first cell broadcast message is received before timing information associated with a cell broadcast channel is received in the separate schedule message.

3. The method of claim 2, wherein the first cell broadcast message is received after a reselection procedure or after termination of a voice call.

4. The method of claim 2, wherein the schedule information in the first cell broadcast message relates to a discontinuous reception schedule defined in the separate schedule message which is a missed schedule message.

5. The method of claim 1, wherein the schedule information is adapted to identify a slot configured to carry the next cell broadcast message.

6. The method of claim 1, wherein the schedule information is adapted to identify a slot configured to carry the next schedule message.

7. The method of claim 1, wherein the separate schedule message is received and includes timing information for one or more subsequent cell broadcast messages during a scheduling period, and further comprising:

receiving the one or more subsequent cell broadcast messages in accordance with the timing information included in the separate schedule message.

8. The method of claim 1, wherein receiving the first cell broadcast message includes:

periodically reading a cell broadcast channel until the first cell broadcast message is received; and parsing the first cell broadcast message for the schedule information.

9. The method of claim 1, wherein the separate schedule message is a missed schedule message.

10. The method of claim 1, further comprising monitoring for the separate schedule message and, if the separate schedule message is received, then receiving the first cell broadcast message and subsequent cell broadcast messages using schedule information in the separate schedule message.

11. The method of claim 1, further comprising monitoring for the separate schedule message and, if the separate schedule message is not received, then receiving subsequent cell broadcast messages following the first cell broadcast message using schedule information in the first cell broadcast message.

12. A user equipment configured for wireless communication, comprising:

at least one processor;

a memory coupled to the at least one processor; and a communication interface coupled to the at least one processor, wherein the at least one processor is configured to:

receive a first cell broadcast message, the first cell broadcast message comprising schedule information indicating timing of a next cell broadcast message or a next schedule message, wherein the schedule information of the first cell broadcast message includes at least a portion of schedule information also provided in a separate schedule message; and receive the next cell broadcast message or the next schedule message according to the schedule information in the first cell broadcast message.

13. The user equipment of claim 12, wherein the processor receives the first cell broadcast message before timing information associated with a cell broadcast channel is received in the separate schedule message.

14. The user equipment of claim 13, wherein the processor receives the first cell broadcast message after a reselection procedure or after termination of a voice call.

15. The user equipment of claim 13, wherein the schedule information in the first cell broadcast message relates to a discontinuous reception schedule defined in the separate schedule message which is a missed schedule message.

16. The user equipment of claim 12, wherein the schedule information is adapted to identify a slot configured to carry the next cell broadcast message.

17. The user equipment of claim 12, wherein the schedule information is adapted to identify a slot configured to carry the next schedule message.

18. The user equipment of claim 12, wherein the separate schedule message is received and includes timing information for one or more subsequent cell broadcast messages during a scheduling period, and wherein the at least one processor is configured to receive the one or more subsequent cell broadcast messages in accordance with the timing information included in the separate schedule message.

19. The user equipment of claim 12, wherein the processor is configured to receive the first cell broadcast message by:

periodically reading a cell broadcast channel until the first cell broadcast message is received; and parsing the first cell broadcast message for the schedule information.

20. The user equipment of claim 12, wherein the separate schedule message is a missed schedule message.

21. The user equipment of claim 12, wherein the at least one processor is further configured to monitor for the separate schedule message and, if the separate schedule separate schedule message and, if the separate schedule message is not received, to then receive subsequent cell broadcast messages following the first cell broadcast message using schedule information in the first cell broadcast message.

22. The user equipment of claim 12, wherein the at least one processor is further configured to monitor for the separate schedule message and, if the separate schedule message is not received, to then received subsequent cell broadcast messages following the first cell broadcast message using schedule information in the first cell broadcast message.

23. A non-transitory processor-readable storage medium having one or more instructions which, when executed by at least one processing circuit, cause the at least one processing circuit to:

receive a first cell broadcast message, the first cell broadcast message comprising schedule information indicating timing of a next cell broadcast message or a next schedule message, wherein the schedule information of the first cell broadcast message includes at least a portion of schedule information also provided in a separate schedule message; and receive the next cell broadcast message or the next schedule message according to the schedule information in the first cell broadcast message.

24. The non-transitory processor-readable storage medium of claim 23, wherein the separate schedule message is received and includes timing information for one or more subsequent cell broadcast messages during a scheduling period, and wherein the one or more instructions cause the at least one processing circuit to receive the one or more subsequent cell broadcast messages in accordance with the timing information included in the separate schedule message.

25. The non-transitory processor-readable storage medium of claim 23, wherein the one or more instructions cause the at least one processing circuit to receive the first cell broadcast message by:

periodically reading a cell broadcast channel until the first cell broadcast message is received; and parsing the first cell broadcast message for the schedule information.

26. The non-transitory processor-readable storage medium of claim 23, wherein the separate schedule message is a missed schedule message.

27. The non-transitory processor-readable storage medium of claim 23, wherein the one or more instructions cause the at least one processing circuit to monitor for the separate schedule message and, if the separate schedule message is received, to then receive the first cell broadcast message and subsequent cell broadcast messages using schedule information in the separate schedule message.

28. The non-transitory processor-readable storage medium of claim 23, wherein the one or more instructions cause the at least one processing circuit to monitor for the separate schedule message and, if the separate schedule message is not received, to then receive subsequent cell broadcast messages following the first cell broadcast message using schedule information in the first cell broadcast message.

* * * * *